United States Patent
Natarajan et al.

(10) Patent No.: US 12,400,133 B2
(45) Date of Patent: Aug. 26, 2025

(54) TRAINING COLLABORATIVE ROBOTS THROUGH USER DEMONSTRATIONS

(71) Applicant: Intel Corporation, Santa Clara, CA (US)

(72) Inventors: Venkataraman Natarajan, Bangalore (IN); Gagan Acharya, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 927 days.

(21) Appl. No.: 17/201,443

(22) Filed: Mar. 15, 2021

(65) Prior Publication Data

US 2021/0201183 A1    Jul. 1, 2021

(51) Int. Cl.
*G06N 5/04*   (2023.01)
*G06N 3/008*   (2023.01)
*G06N 20/00*   (2019.01)

(52) U.S. Cl.
CPC .............. *G06N 5/04* (2013.01); *G06N 3/008* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2018/0157973 A1* | 6/2018 | El-Yaniv | G06N 3/045 |
| 2021/0182996 A1* | 6/2021 | Cella | G06Q 10/0637 |
| 2022/0261639 A1* | 8/2022 | Zolna | G06N 3/092 |

OTHER PUBLICATIONS

Amor et al., Interaction Primitives for Human-Robot Cooperation Tasks, 2014 IEEE International Conference on Robotics and Automation (ICRA), IEEE May 31, 2014, pp. 2831-2837.
Zhang et al., Robot Learning and Execution of Collaborative Manipulation Plans from YouTube Cooking Videos—v3, Feb. 3, 2020, XP55933033, Retrieved from the Internet: URL:https://arXiv.org/pdf/1911.10686v3.pdf [retrieved on Jun. 20, 2022].

* cited by examiner

*Primary Examiner* — Lennin R Rodriguezgonzalez
(74) *Attorney, Agent, or Firm* — Akona IP PC

(57) ABSTRACT

The present disclosure provides describes to train a multi policy ML model to control robots in a multi-robot system in collaborating to perform a task. For example, trajectories associated with manipulating an object to perform the collaborative task can be determined and an ML model trained to output control actions for the robots in the multi-robot system to collaborate to complete the task.

21 Claims, 9 Drawing Sheets

TRAINING COLLABORATIVE ROBOTS THROUGH USER DEMONSTRATIONS

TECHNICAL FIELD

The present disclosure relates generally to training robots and more particularly to training multiple robots to perform collaborative tasks.

BACKGROUND

Machine learning (ML) is increasingly used in modern applications, such as, manufacturing, retail, housing, etc. Another advancement in technology is the use of multiple robot systems, where a large number of robots collaboratively perform complex tasks involving intricate or precise movements, which can often be executed at low latency. For example, multiple robots could be programmed to cooperate to jointly assemble products (e.g., electronic devices, vehicles, airplanes, furniture, or the like) in a factory. As another example, multiple robots could be programmed to cooperate to jointly service products (e.g., servers in a data center, or the like) or to stock shelves in a grocery store.

However, it is not trivial to program, or in the case of ML to train, multiple robots to cooperate in an efficient, easy and practical manner such that the given task can be executed successfully. For example, traditional robotic programming methods, such as, planning and control based methods are not easily scalable. That is, such methods do not scale well as the number of robots collaborating on the task increases.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
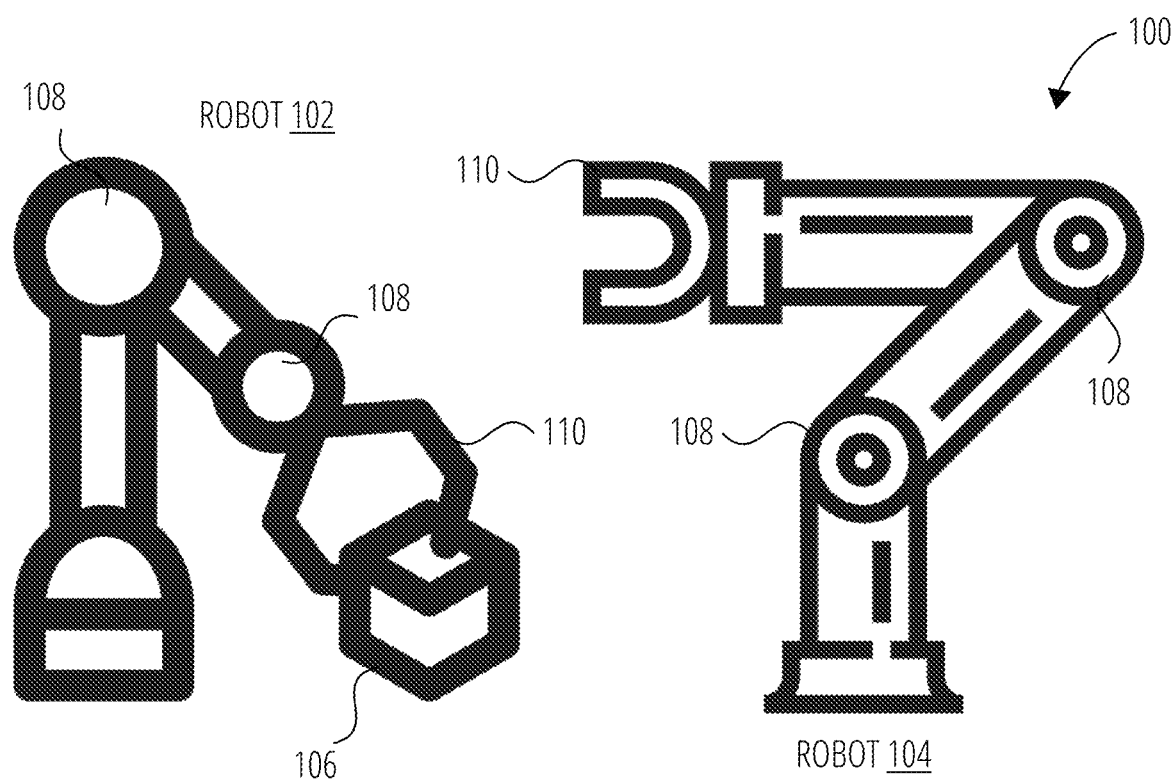
FIG. 1 illustrates a multi-robot system 100 in accordance with at least one example of the present disclosure.

As introduced above, ML and multi-robotic systems are increasingly used in modern times. However, conventional robotic programming and training methodologies are insufficient for use in training multi-robotic systems. For example, imitation learning and behavior cloning are techniques that enable robots to learn tasks and behaviors modeled by a demonstrator, such as a human demonstrating the activity. However, current approaches have been developed for training robotic tasks involving only a single robot. Application of these conventional learning methodologies to collaborative robotic tasks is not efficient as conventional methodologies only provide for training one robot at a time. Furthermore, given the nature of multi robot tasks (e.g., one robot holding a receptacle and another robot placing an object in that receptacle, or the like) a large number of expert demonstrators are needed to train each robot separately as per its individual role in the task, which is inefficient and cumbersome. As such, conventional approaches to training robots in a multi-robot system do not scale well since each robot requires separate training. Furthermore, this brute-force approach to training multiple robots for collaborative tasks is insufficient to capture and synchronize interactions between the collaborating robots.

Another major challenge to training multiple robots for collaboration is the creation of complex robotic simulation environments and models with which to collect expert demonstrations (trajectories) and to visually validate trained policies to ensure the tasks are performed as expected upon deployment. The creation of these multi-robot simulation models is cumbersome due to the complexity of tasks, environments and models involved and often requires sophisticated technical expertise. Due to this, a typical factory worker cannot train or program robotic arms via imitation learning as it requires specialized knowledge of ML, working with simulation tools and environment creation. That is, the experts with knowledge to demonstrate often do not have the knowledge to work with conventional robotic training systems. As such, additional resources are typically needed to conventionally train multi-robot systems.

The present disclosure provides an apparatus and an imitation learning methodology for efficiently and simultaneously training multiple robots for collaborative tasks (e.g., joint object handling, joint assembly, joint maintenance, or the like) where expert demonstrations for multiple collaborating robots are simultaneously acquired and multiple robots executing different roles are simultaneously trained such that the overall number of user demonstrations can be reduced. As such, the apparatus and training methodologies of the present disclosure can be scaled and will require less demonstrations than conventional methods as the number of robots to be trained increases.

In general, the present disclosure provides that a single ML model is trained for all collaborating robots. Whereas, conventional methods train a different ML model for each individual robot in the group. Additionally, the present disclosure provides for creating a training and visualization environment using visual analytics and image learning algorithms. For example, the present disclosure provides for collecting expert demonstrations via an array of cameras and markers attached to the expert demonstrator (e.g., demonstrators hands, or the like) as well as to the object(s) being manipulated. Markers tracked by the camera array are used to simultaneously acquire reference trajectories for training multiple separate robotic arms performing different roles in collaborative tasks, such as joint assembly of parts. Said differently, the present disclosure provides to acquire all the reference trajectories for all the collaborating robots simultaneously (e.g., in as few demonstration sessions as possible, or the like) and to train a single policy Ml model, which is trained to output actions for all robots collaborating in the system.

Furthermore, the present disclosure provides to generate a simulation environment based on the images captured by the camera array. For example, the images can be processed to identify a layout of the environment in which the collaborative task is to be performed and to identify the object to be manipulated as part of the collaborative task. Furthermore, the images can be processed to identify the number of robots and their starting positions. In some examples, the simulation environment can be used to validate the ML model and/or to provide feedback during training of the ML model.

Accordingly, the present disclosure can provide training for multi-robotic systems to perform a collaborative task "at-one-go." The expert demonstrators wear markers and perform tasks in a real-world (e.g., factory, or the like) setting. The system provides to identify trajectories associated with the demonstration, generate a simulation environment and to train a single ML model to learn policies to control all the robots in the multi-robotic system based on the trajectories and the simulation environment.

FIG. 1 illustrates a multiple robot system 100, in accordance with non-limiting example(s) of the present disclosure. Multiple robot system 100 is provided for purposes of illustration only and is not intended to be limiting. However, given that the present disclosure provides for training of multi-robot systems, an example multiple robot system 100 is depicted. Multiple robot system 100 includes robot 102, robot 104, and object 106. In general, robots 102 and 104 are arranged to manipulate object 106. As contemplated in the present disclosure, robots 102 and 104 could be any type of robot, such as, a robotic arm (e.g., as depicted) having an articulating joint 108 and a gripper 110. Robots 102 and 104 can be fixed or mobile. Furthermore, the gripper 110 can be any of a variety of grippers, such as, a hand, pinchers, a magnet, or the like. The present disclosure provides apparatuses and methodologies for training an ML model for use in controlling robots 102 and 104. In general, multiple robot system 100 can be provided for any of a variety of applications, such as, industrial, retail, manufacturing, security, housing, or the like. Object 106 to be manipulated by robot 104 and 106 can be any type of object and examples are not provided given the exhaustive nature of the possible examples.

Figure 2:
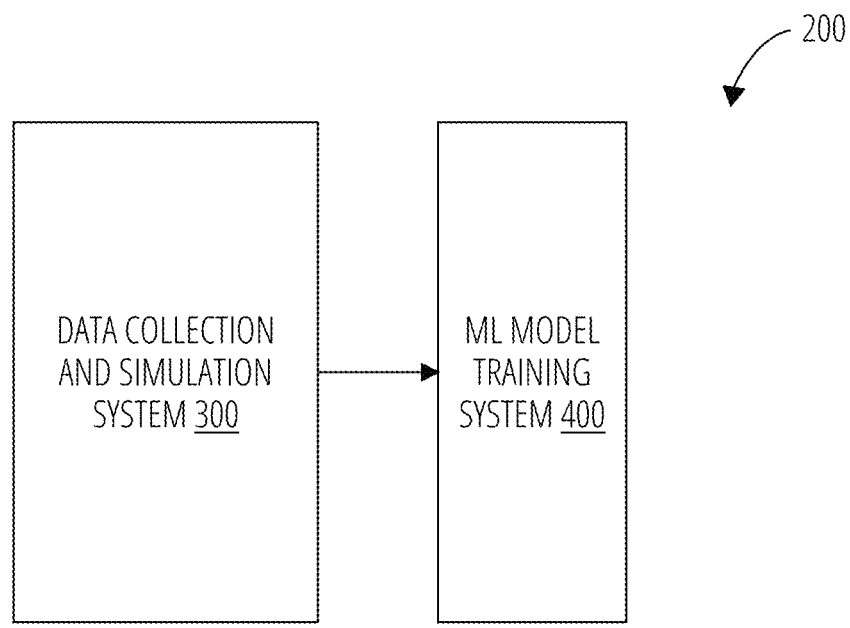
FIG. 2 illustrates a multi-robot training system 200 in accordance with at least one example of the present disclosure.

FIG. 2 illustrates a multi robot training system 200, in accordance with non-limiting example(s) of the present disclosure. Multi robot training system 200 includes data collection and simulation system 300 and ML model training system 400. Individual sub-systems of data collection and simulation system 300 and ML model training system 400 are described in greater detail below. However, in general, multi robot training system 200 is arranged to provide policy learning for multiple robots simultaneously using a single ML model. For example, multi robot training system 200 could be provided to train a ML model (see FIG. 5) for use in controlling robot 104 and 106 of multiple robot system 100 in cooperating to manipulate object 106.

Data collection and simulation system 300 provides in-situ collection of trajectories for collaborative tasks with which robots are to be trained. Data collection and simulation system 300 is further provided with a predictive state estimation constraint, which when combine with an imitation learning algorithm (e.g., as implemented by ML model training system 400) provides that policies can be learned with reduced trajectories required for training versus conventional learning methodologies.

Furthermore, data collection and simulation system 300 provides multi-robot simulation for the particular task and robot configuration. Specifically, data collection and simulation system 300 provides computer vision systems arranged for the creation of multi-robot simulation models based on the acquired trajectories from the demonstration.

ML model training system 400 provides for training on an ML model (e.g., ML model 500, or the like) based on trajectories collected via 300 and the simulation environments created by data collection and simulation system 300.

Figure 3:
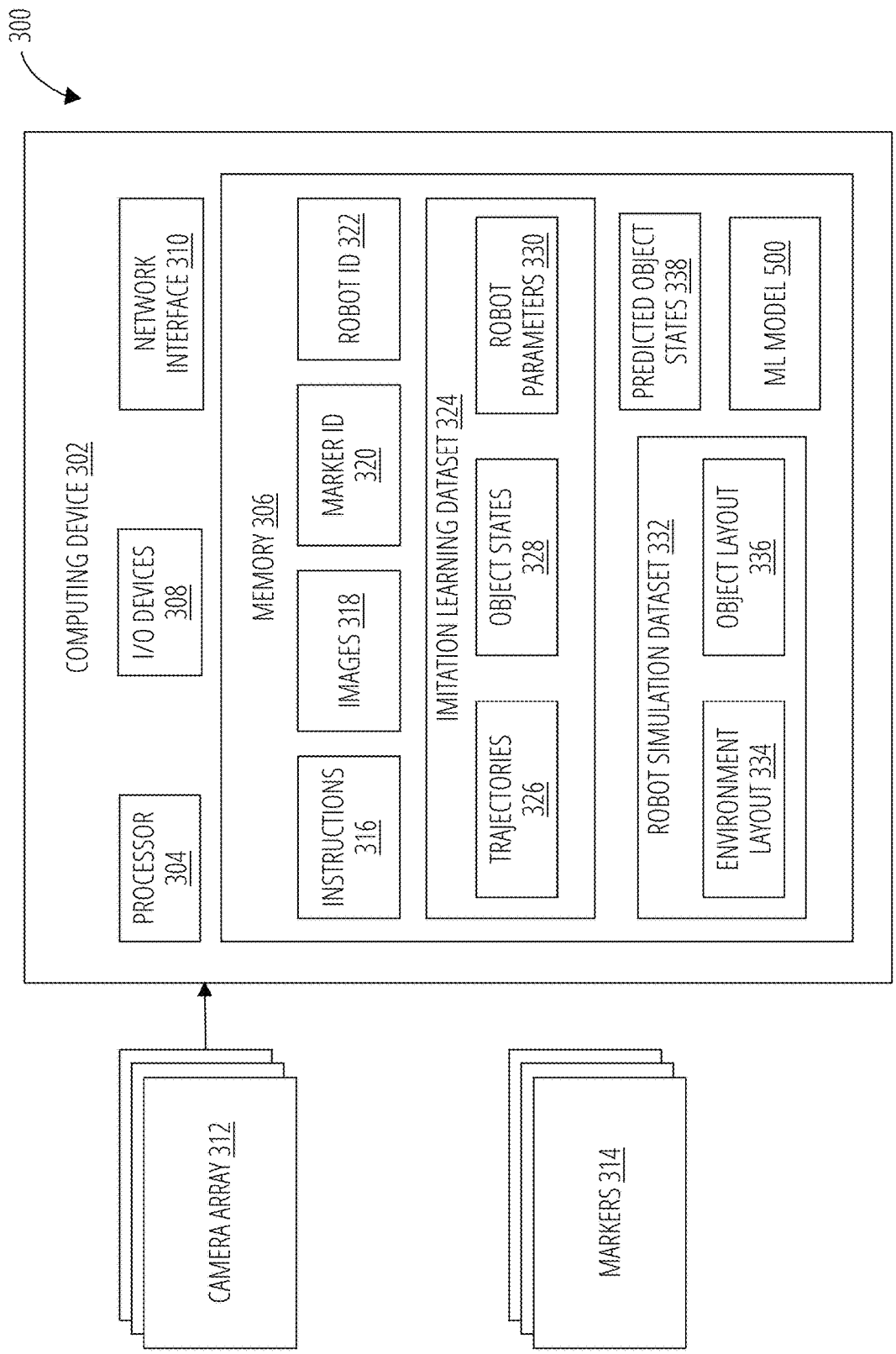
FIG. 3 illustrates a data collection and simulation system 300 in accordance with at least one example of the present disclosure.

FIG. 3 illustrates a data collection and simulation system 300, in accordance with non-limiting example(s) of the present disclosure. In general, data collection and simulation system 300 is a system for capturing robot states and/or actions from an expert demonstrator (e.g., human demonstrator, or the like) during a demonstration. Data collection and simulation system 300 includes a computing device 302, a camera array 312, and markers 314.

In general, markers 314 can be any of a variety of markers used to identify trajectories during the demonstration. For example, markers 314 can be OpenCV ArUco markers. As a specific example, expert demonstrators can wear markers 314 on each hand. Each marker markers 314 can have a unique identifier (ID) with which individual robots in the collaborative robot system (e.g., multiple robot system 100) can be mapped. Said differently, markers 314 can have marker IDs 320 which can be mapped to robot IDs 322. In some examples, robot IDs 322 are assigned to marker IDs 320 before a demonstration. It is noted, that markers can be attached to multiple locations. As a specific example, markers 314 can be affixed to multiple parts of an expert demonstrator (e.g., right hand, left hand, an arm, right foot, left foot, fingers, or the like). Likewise, markers 314 can be attached to a fixed location or reference point as well as to the object to be manipulated. For example, the markers 314 attached to the fixed location can be used to transform and combine the positions of markers obtained from the different cameras of the camera array 312 recorded during a demonstration.

In general, markers 314 can be affixed to expert demonstrators in an number of manners. As an example, markers 314 can be stickers arranged to be quickly affixed to portions (e.g., hand, finger, wrist, arm, or the like) of expert demonstrators. As another example, markers 314 could be implemented as gloves having graphical markers (e.g., AcUco markers, or the like) or electronic markers (e.g., radio-frequency identification (RFID) emitters, infrared (IR) emitters, or the like). Additionally, gloves could be provided with sensors (e.g., pressure, temperature, or the like). Furthermore, markers 314 can be affixed to objects to be manipulated by the expert demonstrators as well as to fixed objects (or reference points) in the environment.

Camera array 312 can include any of a variety of cameras (e.g., video cameras, still cameras, IR cameras, ArUco reader cameras, RFID reader cameras, or the like) provided cameras of camera array 312 are arranged to read, scan, or otherwise capture markers 314. The cameras within camera array 312 can be placed in the real world environment in which the demonstration is to take place. Furthermore, the placement of cameras within camera array 312 can be based on the task to be demonstrated. For example, for tasks where the robots in the collaborative robot system are to come close to each other during collaboration, more cameras can be used, or cameras can be placed at different positions and orientations around the environment to mitigate any occlusion that can arise during the expert demonstration.

In general, computing devices 302 is coupled to camera array 312 and arranged to receive information, data, or images 318 from camera array 312 and to generate imitation learning dataset 324 with which an ML model (e.g., ML model 500, or the like) can be trained. Computing device 302 includes processor 304, memory 306, input and/or output (I/O) devices 308, and network interface 310.

The processor 304 may include circuitry or processor logic, such as, for example, any of a variety of commercial processors. In some examples, processor 304 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 304 may include graphics processing portions and may include dedicated memory, multiple-threaded processing and/or some other parallel processing capability. In some examples, the processor 304 may be an application specific integrated circuit (ASIC) or a field programmable integrated circuit (FPGA).

The memory 306 may include logic, a portion of which includes arrays of integrated circuits, forming non-volatile memory to persistently store data or a combination of non-volatile memory and volatile memory. It is to be appreciated, that the memory 306 may be based on any of a variety of technologies. In particular, the arrays of integrated circuits included in memory 120 may be arranged to form one or more types of memory, such as, for example, dynamic random access memory (DRAM), NAND memory, NOR memory, or the like.

I/O devices 308 can be any of a variety of devices to receive input and/or provide output. For example, I/O devices 308 can include, a keyboard, a mouse, a joystick, a foot pedal, a display, a touch enabled display, a haptic feedback device, an LED, or the like.

Network interface 310 can include logic and/or features to support a communication interface. For example, network interface 310 may include one or more interfaces that operate according to various communication protocols or standards to communicate over direct or network communication links. Direct communications may occur via use of communication protocols or standards described in one or more industry standards (including progenies and variants). For example, network interface 310 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. Additionally, network interface 310 can include logic and/or features to enable communication over a variety of wired or wireless network standards (e.g., 802 (deleted).11 communication standards). For example, network interface 310 may be arranged to support wired communication protocols or standards, such as, Ethernet, or the like. As another example, network interface 310 may be arranged to support wireless communication protocols or standards, such as, for example, Wi-Fi, Bluetooth, ZigBee, LTE, 5G, or the like.

Memory 306 can include instructions 316, images 318, marker ID 320, robot ID 322, imitation learning dataset 324, robot simulation dataset 332, predicted object states 338, and ML model 500.

Imitation learning dataset 324 includes trajectories 326, object states 328, and robot parameters 330 while robot simulation dataset 332 includes environment layout 334 and object layout 336.

During operation, processor 304 can execute instructions 316 to receive images 318 from camera array 312. Further, processor 304 can execute instructions 316 to process images 318 to detect markers 314 in images 318 and to determine positioning of the markers relative to the environment, to a fixed point, to the object, or the like. For example, instructions 316 can include a ROS node (e.g., based on OpenCV libraries, or the like), which when executed by processor 304 can publish the marker ID 320 and a computed position from each of images 318. The computed positions can be saved as trajectories 326. Likewise, markers 314 can be affixed to the object to be manipulated (e.g., object 106, or the like) and object states or positions can be derived as indicated above. The computed object states can be saved as object states 328.

Furthermore, processor 304 can execute instructions 316 to apply image recognition techniques to images 318. As a specific example, processor 304 can execute instructions 316 to detect facial features (e.g., blink, mouth opening, smile, nod, or the like) and associate, based on markers 314, the detected facial expressions with an expert demonstrator. With some examples, facial expressions can be used to provide indications of various robot parameters (e.g., grip actuators, or the like). With another example, I/O devices 308 can be used to provide indications of actions related to the demonstration. For example, pressure applied by an expert demonstrator to the object being manipulated can be captured (e.g., based on a sensor in a glove, a facial expression of an expert demonstrator, or the like). Processor 304 can execute instructions 316 to save the identified actions as robot parameters 330.

Accordingly, data collection and simulation system 300 is described wherein trajectories related to a task for collaborative robots can be captured. For example, if a first expert demonstrator raises their arm upwards, the same motion is reflected by the trajectories 326, which are used to train an ML model to control a first robot to make a corresponding action or motion.

Data collection and simulation systems 300 additionally leverages vision perception to create a simulation environment to simulate the robots collaboratively performing the task, for use in providing feedback for the overall training process. Said differently, processor 304 can execute instructions 316 to create an intermediary task simulation environment with the required objects and number of robots before the expert demonstrators start demonstrating the collaborative task.

Processor 304 can execute instructions 316 to determine an environment layout 334 (e.g. table, objects, number of robot arms, initial robot positions, or the like). With some examples, processor 304 can execute instructions 316 to determine the number of robotic arms required to achieve the task based on the number of markers 314. Additionally, processor 304 can execute instructions 316 to determine an initial pose of the robots, for example, based on the initial orientation of the markers 314.

Processor 304 further executes instructions 316 to identify object layout 336, including the type and pose of the objects that are to be manipulated by the robots (e.g., robots 102 and 104). In some examples, markers 314 can include subsets or multiple different types of markers. For example, one type of markers 314 can be used to mark robots while another type of markers 314 can be used to mark objects, and still another type of markers 314 can be used to mark fixed reference locations.

Figure 4:
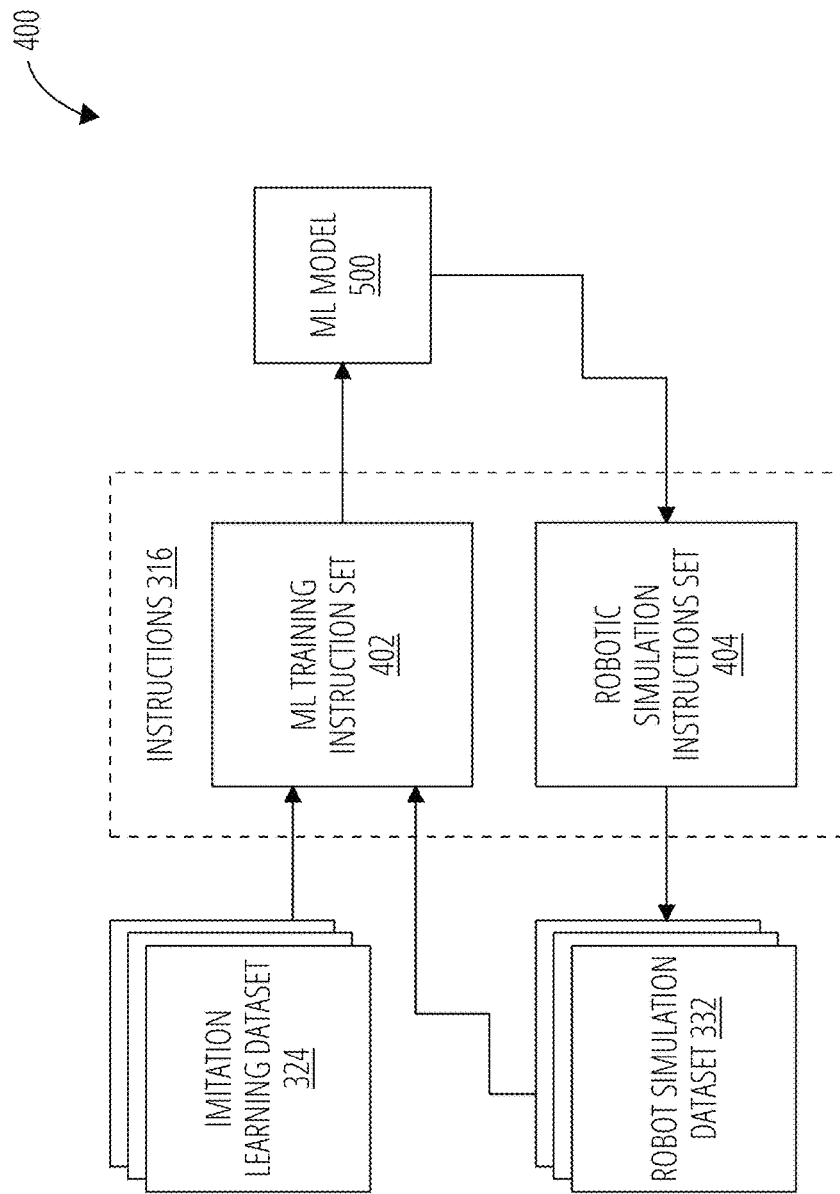
FIG. 4 illustrates an ML model training system 400 in accordance with at least one example of the present disclosure.

FIG. 4 illustrates ML model training system 400, in accordance with non-limiting example(s) of the present disclosure. With some examples, ML model training system 400 can be implemented by a computing device, such as computing device 302. For example, 400 can be implemented by instructions 316 executable by processor 304. In general, ML model training system 400 can be arranged to train ML model 500 based on imitation learning dataset 324 and robot simulation dataset 332.

ML model training system 400 can include an ML training instruction set 402 and robotic simulation instructions set 404. ML training instruction set 402 may utilize one or more ML model training algorithms (e.g., back propagation, convolution, adversarial, or the like) to train ML model 500 from imitation learning dataset 324 and robot simulation dataset 332. Often, training ML model 500 is an iterative process where weights and connections within ML model 500 are adjusted to converge upon a satisfactory level of inference (e.g., outputting robotic actions, or the like) for ML model 500. It is noted that a variety of ML model training algorithms could be provided according to the present disclosure. However, an example training methodology is described with reference to ML model 500 and FIG. 5 below.

Robotic simulation instructions set 404 provides simulation of the robots being trained. For example, ML model 500 is arranged to output control actions (e.g., movements control actions, gripper status control actions, or the like) and robotic simulation instructions set 404 can be provided to simulate predicted object states 338 based on these outputs. Predicted object states 338 along with imitation learning dataset 324 and robot simulation dataset 332 can be used to train and/or test ML model 500.

Figure 5:
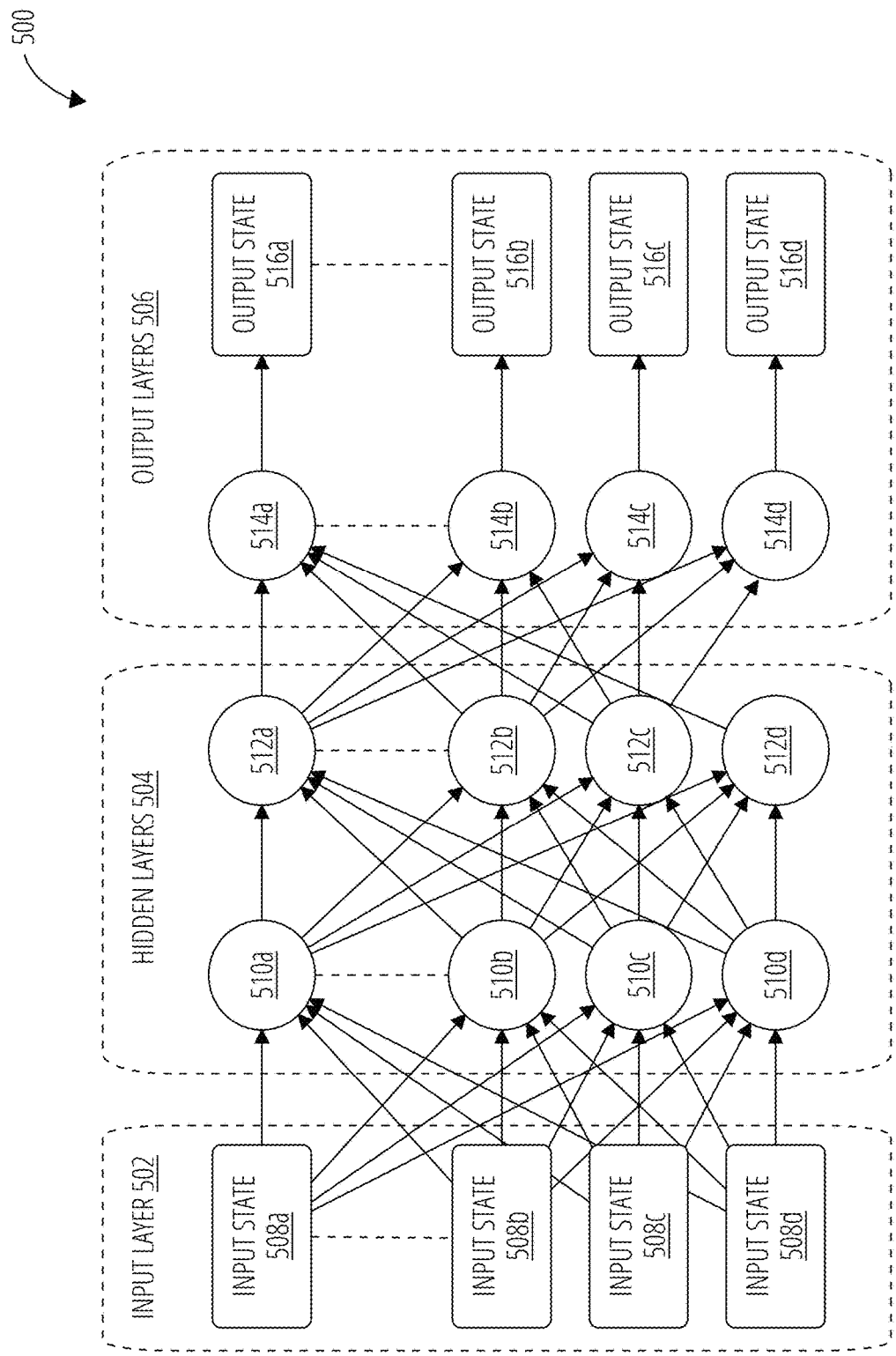
FIG. 5 illustrates an ML model 500 in accordance with at least one example of the present disclosure.

FIG. 5 illustrates an ML model 500, in accordance with non-limiting example(s) of the present disclosure. ML model 500 is depicted as a multi layer neural network. However, in practice, ML model 500 could be any of a variety of ML models, such as, for example neural networks as depicted, convoluted neural networks, fuzzy logic networks, decision tree networks, or the like. Examples are not limited in this context. ML model 500 includes an input layer 502, hidden layers 504, and output layers 506. In general, multi robot training system 200 can be arranged to train ML model 500. More specifically, ML training instruction set 402 can be arranged to train ML model 500 based on data (e.g., trajectories, or the like) captured by data collection and simulation system 300.

Input layer 502 includes inputs for input states 508a, 508b, 508c, and 508d. In general, input states 508a, 508b, 508c, and 508d can be states (or inputs, associated with robots in the system (e.g., robot 102 and 104, or the like) as well as states of objects or parts to be manipulated by the robots (e.g., object 106, or the like) as well as inputs associated with goals of the multiple robot system 100 with which ML model 500 is trained to control. Hidden layers 504 include multiple neurons. In practice each layer of neurons in hidden input layer 502 can have many neurons (e.g., 64, 128, 256, etc.). However, for simplicity of illustration, hidden neuron 510a, 510b, 510c, 510d, 512a, 512b, 512c, and 512d are depicted. In general, neurons in hidden layers 504 can be fully connected (e.g., as depicted) or not. Furthermore, neurons in hidden layers 504 can have any of a variety of activations functions. In specific examples, neurons within hidden layers 504 can have a rectified linear unit (ReLu) activation function. Output layers 506 include output neurons 514a, 514b, 514c, and 514d as well as output states 516a, 516b, 516c, and 516d. The output neurons could have the same activation function as the hidden layer neurons, or a different activation function (e.g., hyperbolic tangent (Tan h), or the like). Output states 516a, 516b, 516c, and 516d can correspond to actions for the robots (e.g., robots 102 and 104, or the like) as well as predicted future states of the object to be manipulated (e.g., object 106, or the like).

As a specific example, input states can correspond to actions of the robots (e.g., gripper displacement, actuation, etc.) between consecutive time steps. With some examples, data corresponding to the robot states as well as the object states is collected (described in greater detail below). Input data corresponding to the robot states and/or the object states can be normalized. Such input data can be normalized via a variety of techniques, such as, for example, sample mean, variance, or the like. The normalized input data is concatenated and used as input to the neural network.

ML model 500 is trained using a weighted combination of the trajectory, gripper actuation and estimation loss. For example, trajectory loss (Trajector_MSE) can be derived as the mean squared error (MSE) between the predicted gripper state and the actual gripper state executed at that stage during demonstration by the expert. In particular, the training loss used during training of the ML model 500 can be Loss=Trajectory_MSE+α*Actuation_MSE+ β*State_estimation_MSE. The gripper actuation loss (Actuation_MSE) can be the MSE between the predicted gripper force and that demonstrated. Similarly, the state estimation loss (State_estimation_MSE) can be the loss between the predicted future object state and the object state observed during the task demonstration. The variables alpha (α) and beta (β) are scalars that can be adjusted as hyperparamters during training or left constant. It is noted, with some examples, the state estimation output is used in the training phase of the learning process and the associated loss acts as an auxiliary cost function that allows the ML model 500 to train using a lower number of expert trajectories.

Figure 6A:
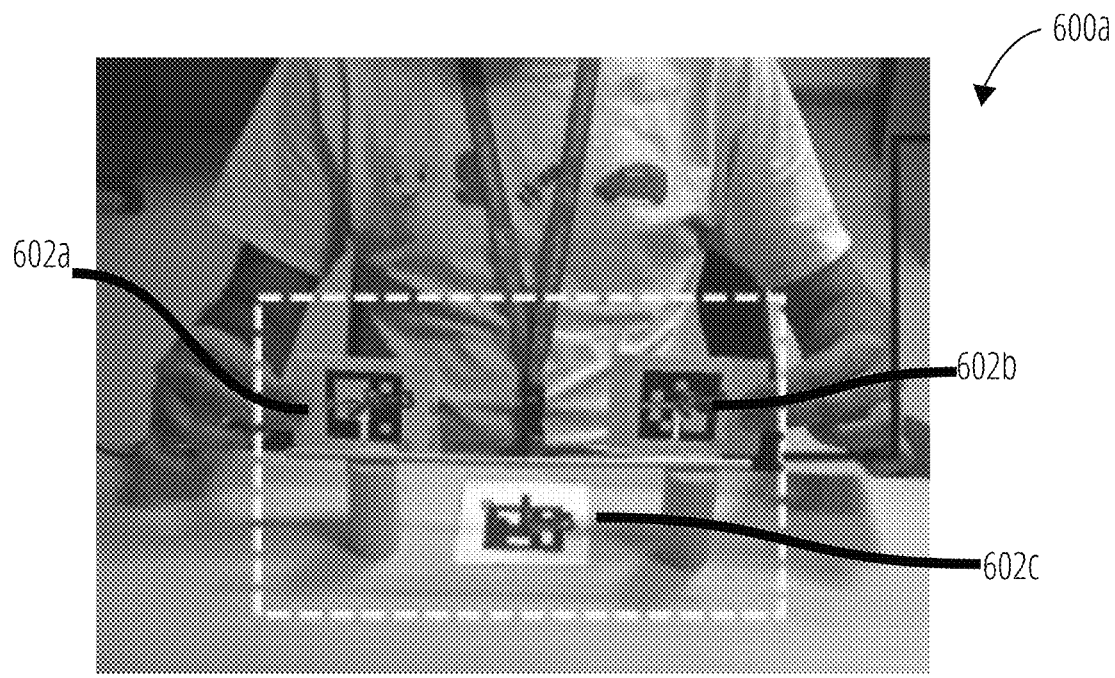
FIG. 6A illustrates an image 600a in accordance with at least one example of the present disclosure.
Figure 6B:
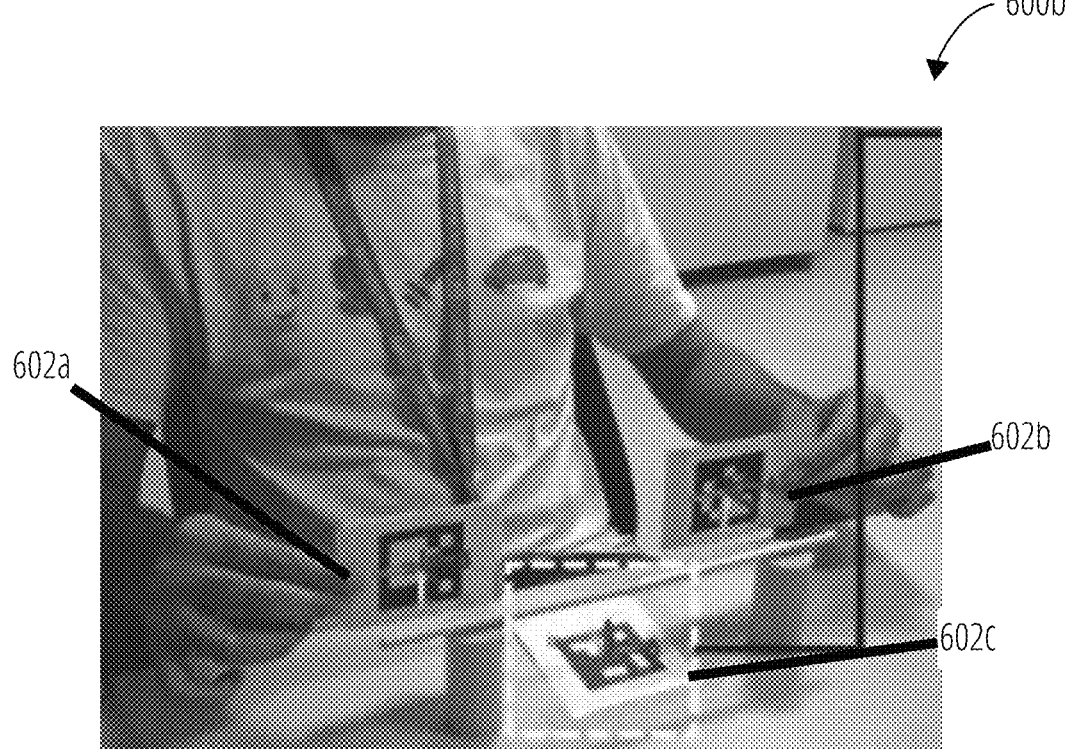
FIG. 6B illustrates an image 600b in accordance with at least one example of the present disclosure.

As noted, data collection and simulation system 300 includes a camera array 312 arranged to capture images from multiple angles or viewpoints during an expert demonstration. FIG. 6A and FIG. 6B illustrate images 600a and 600b, respectively, which can correspond to images 318 captured by camera array 312 during a demonstration. Images 600a and 600b depicts markers 602a, 602b, and 602c from different angles. It is noted that multiple viewpoints or angles are captured to create a redundancy that makes the position estimation with which trajectories 326 are computed (e.g., described above) more accurate and is particularly useful where some markers (e.g., markers 314, or the like) might disappear from one image due to occlusion. For example, marker 602c from image 600b is less clear or less visible than in image 600a. In some demonstrations, an expert demonstrator, or the object, might occlude a markers 314 from view of one or more of the cameras in the camera array 312.

Processor 304 can execute instructions 316 to process the frames or images from the camera array in parallel to generate imitation learning dataset 324. For example, the trajectories 326 can be determined based on marker 602a and 602b position relative to the fixed marker 602c. Likewise, robot parameters 330 can be determined based on facial recognition, or other inputs received. For example, a microphone can be active and record verbal instructions (e.g., open gripper, close, gripper, light touch, firm grasp, etc.), which are stored as robot parameters 330. Frames of images 318 taken prior to the demonstration can likewise be processed in parallel to determine environment layout 334 and object layout 336 as described above.

Furthermore, processor 304 can execute instructions 316 to create a simulation environment (e.g., reflected by robot simulation dataset 332, or the like) that is used for both data collection (e.g., determination of trajectories 326, or the like) as well as identifying robots 102 and 104 for use in completing the collaborative task. For example, processor 304 can execute instructions 316 to create a task simulation environment with the required objects and number of robots before the experts start demonstrating the collaborative task. Environment parameters associated with the simulated environment can be extracted using the task image layout (e.g. table, objects, number of robot arms, their position, or the like) and stored in environment layout 334 and/or object layout 336. With some examples, an initial operation can be to determine the number of robotic arms required to achieve the task. For example, processor 304 can execute instructions 316 to determine the required number of robot arms based on the number of markers 314 worn by the expert demonstrators reflected in images 318. Furthermore, processor 304 can execute instructions 316 to determine initial poses for the robots in the simulation.

Subsequently, processor 304 can execute instructions 316 to recognize the type and pose of the objects (e.g., object 106, or the like) that are to be manipulated. For example, processor 304 can execute instructions 316 to identify the type of objects based on an object recognition package, such as, YOLOv3, which can be trained on a pre-defined library of standard (e.g., cube, cylinder, or the like). Additionally, processor 304 can execute instructions 316 to identify the pose of the object based on markers 314 present on the object. As noted above, different types (e.g., color, pattern, or the like) of markers 314 can be used to distinguish between expert demonstrators and objects.

Figure 7:
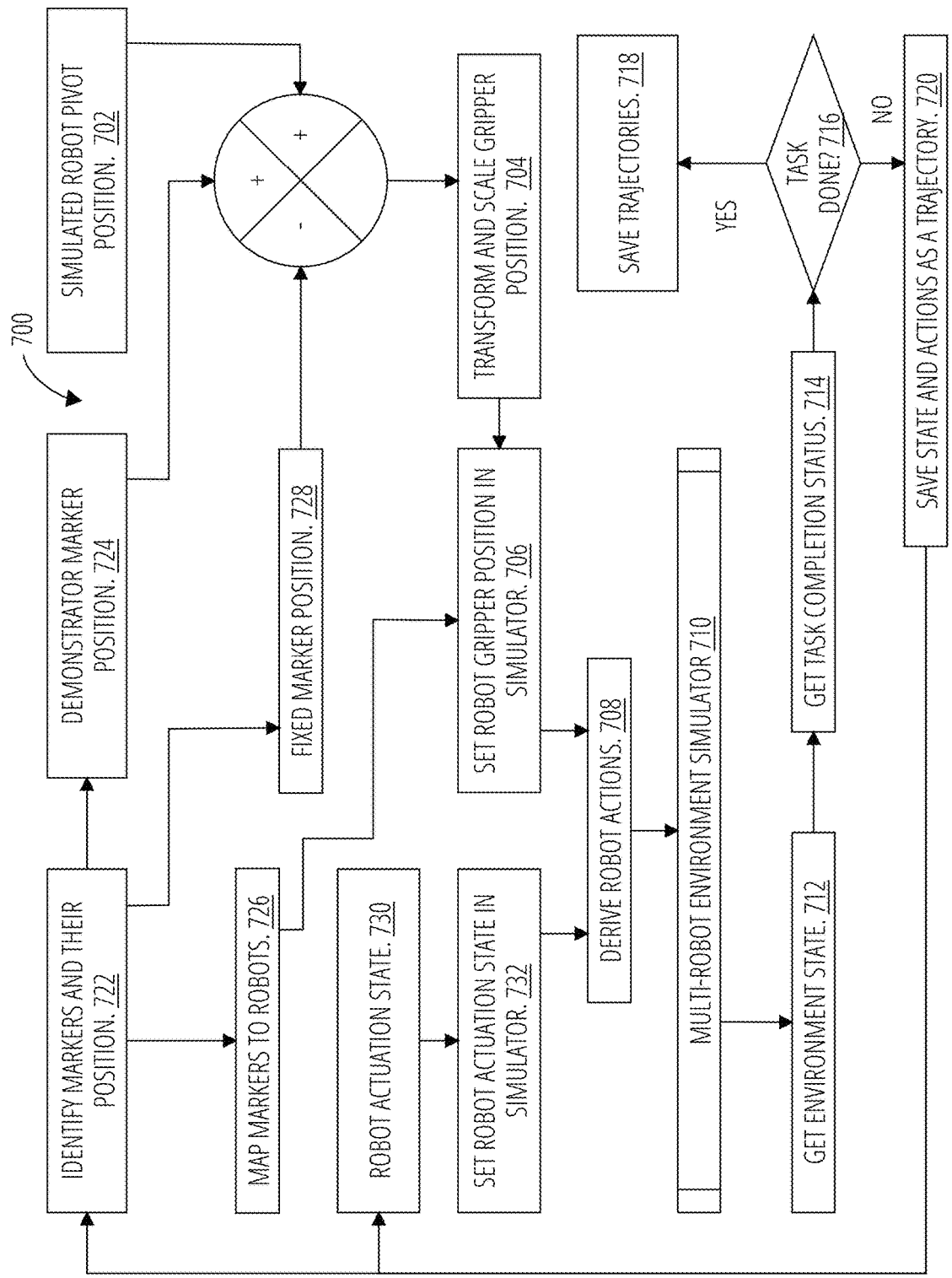
FIG. 7 illustrates a routine 700 for determining trajectories of robots for training, in accordance with at least one example of the present disclosure.

FIG. 7 illustrates routine 700, in accordance with non-limiting example(s) of the present disclosure. In general, routine 700 can be implemented by a computing device, such as computing device 302. Routine 700 is directed to solving technological problems with respect to training robots and specifically with respect to training multiple robots to collaborate in performing a task. Routine 700 can begin at block 702, block 722 and block 730. At block 702 "simulated robot pivot position" a pivot position (e.g., pose, updated pose, or the like) of the robots 102 and 104 are determined. Similarly, at block 722 "identify markers and their positions" markers 314 and their respective positions are be determined. Furthermore, at block 730 "robot actuation state" actuation states (e.g., gripper state open/closed, or the like) of the robots 102 and 104 are determined. For example, processor 304 can execute instructions 316 to process images 318 and identify markers 314 as well as "cues" (e.g., facial features, or the like) to determine the simulated robot position, the initial marker positions and the robot actuation states.

Continuing to from block 722 to blocks 724, 726, and 728. At block 724 "demonstrator marker position" the position of makers associated with demonstrators is determined" while at block 728 "fixed marker position" the position of fixed markers is determined. Furthermore, at block 726 "map markers to robots" the identified markers are mapped to specific robots, for example, based on a marker ID associated with teach robot, or the like. For example, processor 304 can execute instructions 316 to determine a mapping between markers and specific robots as well as to determine the positions of the markers, both fixed and ones affixed to demonstrators.

From blocks 702, 724, and 728, the position of the robot arms (e.g., the gripper 110, or the like) can be determined and at block 704 the position can be transformed and/or scaled. Routine 700 continues at blocks 706 and 732. At block 706 "set robot gripper position in simulator" and block 732 "set robot actuation state is simulator" the position and state of the grippers 110 of robots 102 and 104 can be set in the simulator. Continuing to block 708 "derive robot actions" the actions of the robots 102 and 104 are derived from the position and state of the grippers 110. For example, processor 304 can execute instructions 316 to derive the actions of the robots 102 and 104 based on the determined position and state of the grippers 110.

From block 708, subroutine block 710 "multi-robot environment simulator" determines an environment state based on the derived robot actions. For example, processor 304 can execute instructions 316 to determine the state of the environment (e.g., environment layout 334, object layout 336, predicted object states 338, or the like) based on the derived robot actions.

Continuing to block 712 "get environment state" and block 714 "get task completion status" the current environment state and status of completion of the task can be identified from the determined state of the environment. At decision block 716 "task done?" is determined based on the environment state and task completion status determined at blocks 712 and 714. From decision block 716, routine 700 completes and trajectories 326 are saved at block 718 "save trajectories" based on the robot actions determined at block 708 or the robot actions determined at block 708 are saved as a trajectory and the routine 700 continues to determine additional trajectories.

Figure 8:
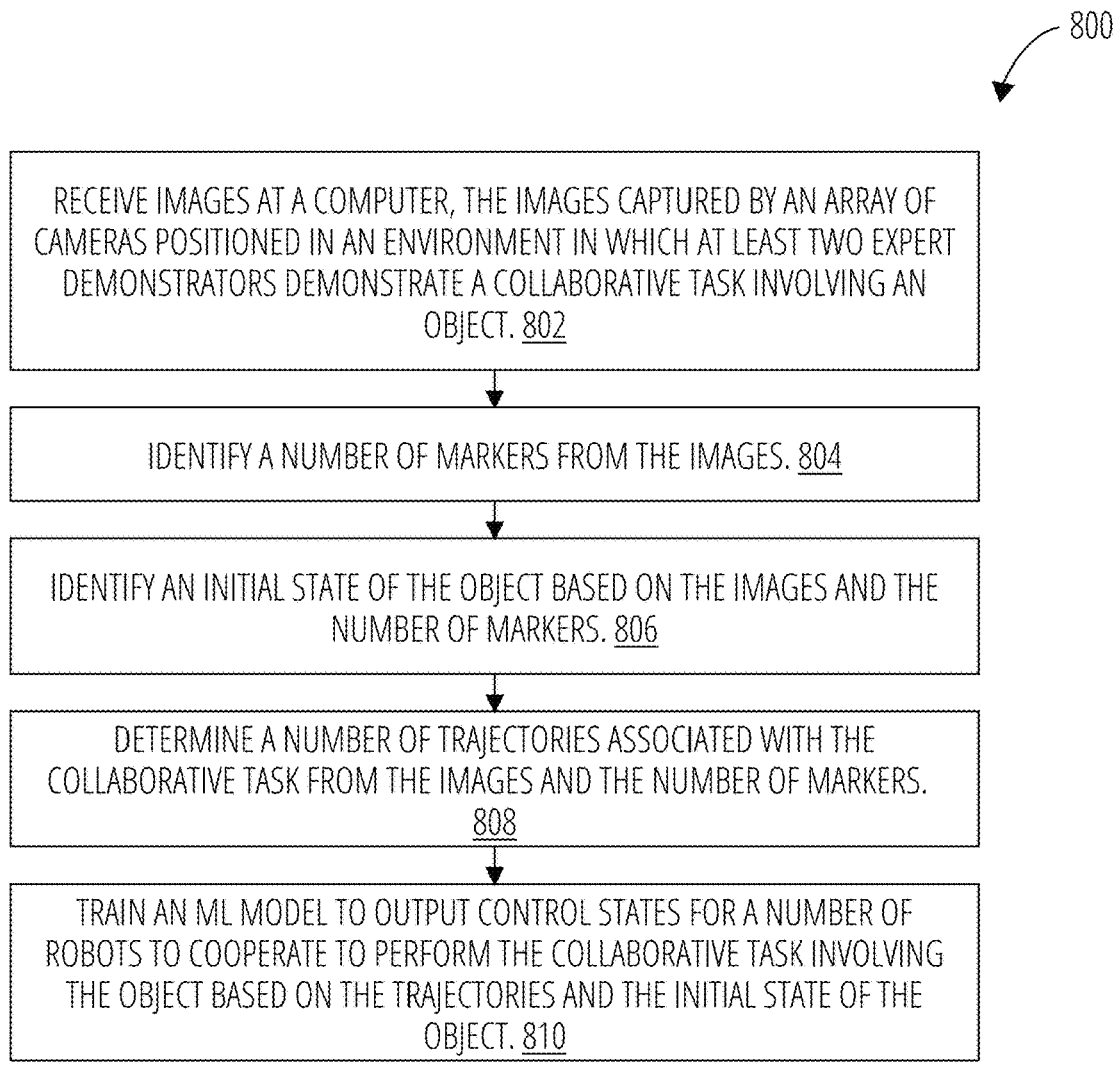
FIG. 8 illustrates a routine 800 for training robots for collaborative behavior, in accordance with at least one example of the present disclosure.

FIG. 8 illustrates routine 800, in accordance with non-limiting example(s) of the present disclosure. In general, routine 800 can be implemented by a computing device, such as computing device 302. Routine 800 is directed to solving technological problems with respect to training robots and specifically with respect to training multiple robots to collaborate in performing a task. Routine 800 can begin at block 802. At block 802 "receive images at a computer, the images captured by an array of cameras positioned in an environment in which at least two expert demonstrators demonstrate a collaborative task involving an object" images captured during an expert demonstration of a collaborative task can be received. For example, processor 304 of computing device 302 can execute instructions 316 to receive images 318 from camera array 312.

Continuing to block 804 "identify a number of markers from the images" markers in the images can be identified. For example, processor 304 of computing device 302 can execute instructions 316 to identify markers 314 from the images 318 received at block 802. For example, processor 304 can execute instructions 316 to identify markers 314 from images 318 via image recognition techniques, or via another method (e.g., RFID, IR sensing technology, or the like).

Continuing to block 806 "identify an initial state of the object based on the images and the number of markers" an initial state of the object to be manipulated by the experts during the expert demonstration can be identified. For example, processor 304 of computing device 302 can execute instructions 316 to identify an initial state of object (e.g., object 106, or the like) to be manipulated. In some examples, the initial state of object 106 can be identified based on markers 314 affixed to the object and markers 314 affixed to a fixed references point or to the environment layout 334.

Continuing to block 808 "determine a number of trajectories associated with the collaborative task from the images and the number of markers" trajectories associated with the collaborative task (e.g., manipulating the object, or the like) are determined. For example, processor 304 of computing device 302 can execute instructions 316 to determine trajectories 326 associated with a collaborative task, such as, expert demonstrators manipulating object 106.

Continuing to block 810 "train an ML model to output control states for a number of robots to cooperate to perform the collaborative task involving the object based on the trajectories and the initial state of the object" an ML model can be trained to output control states for the robots in the multi-robot system to perform the collaborative task. For example, processor 304 of computing device 302 can execute instructions 316 to train ML model 500 to output control states for robots 102 and 104 to manipulate object 106 in a collaborative manner based on trajectories 326 and the object states 328, including the initial object state and predicted object states 338.

Figure 9:
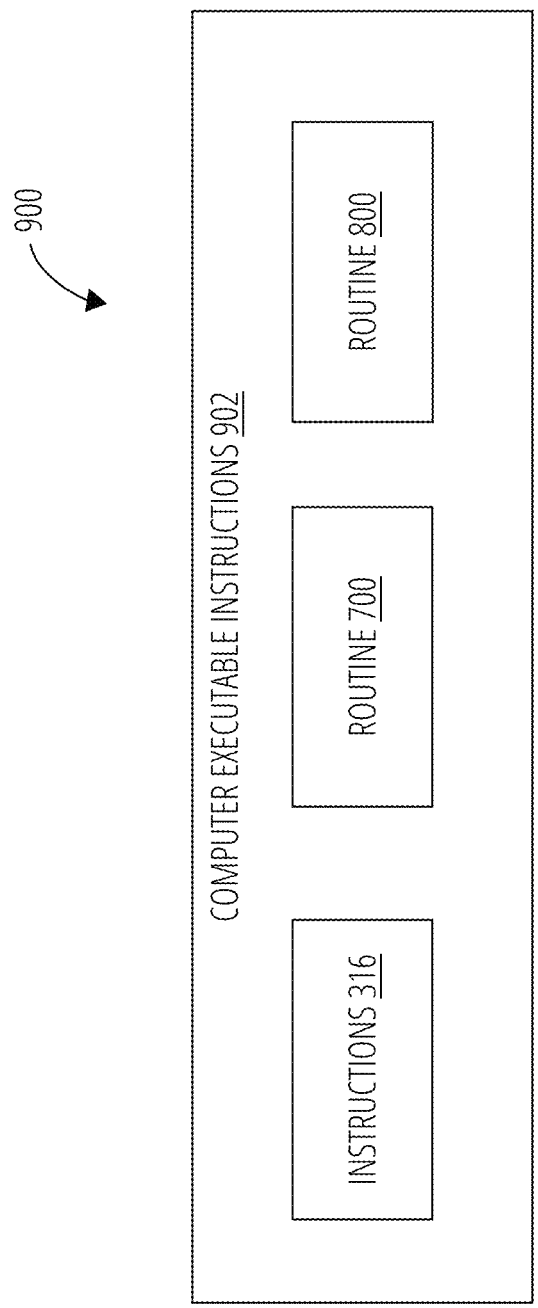
FIG. 9 illustrates a computer-readable storage medium 900 in accordance with example(s) of the disclosure.

FIG. 9 illustrates computer-readable storage medium 900. Computer-readable storage medium 900 may comprise any non-transitory computer-readable storage medium or machine-readable storage medium, such as an optical, magnetic or semiconductor storage medium. In various embodiments, computer-readable storage medium 900 may comprise an article of manufacture. In some embodiments, computer-readable storage medium 900 may store computer executable instructions 902 with which circuitry (e.g., processor 304, or the like) can execute. For example, computer executable instructions 902 can include instructions to implement operations described with respect to instructions 316, routine 700, and/or routine 800. Examples of computer-readable storage medium 900 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 902 may include any suitable type of code, such as source code, compiled code, interpreted code, executable code, static code, dynamic code, object-oriented code, visual code, and the like.

Figure 10:
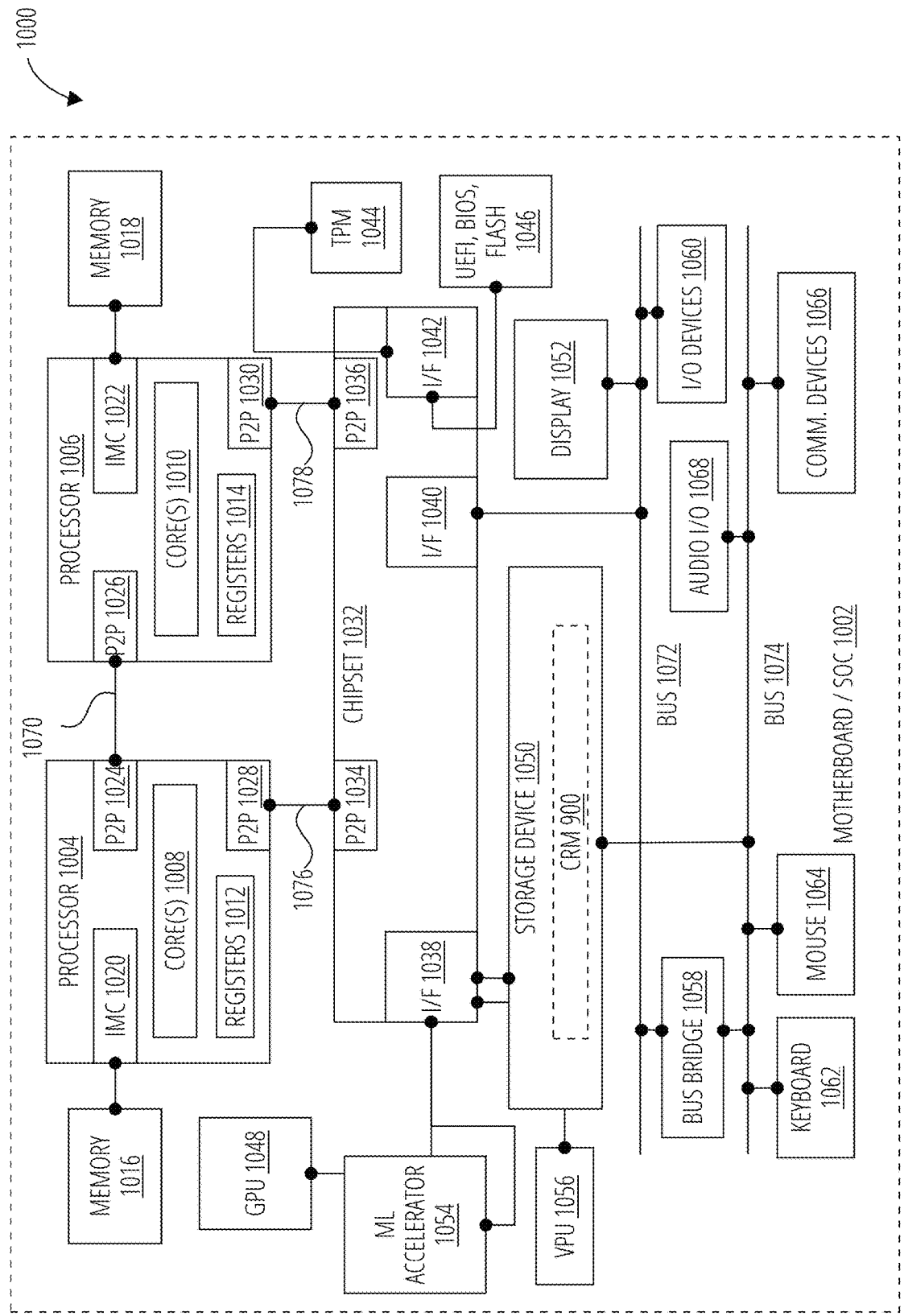
FIG. 10 illustrates a computing system in accordance with example(s) of the disclosure.

FIG. 10 illustrates an embodiment of a system 1000. System 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1000 may have a single processor with one core or more than one processor. Note that the term "processor" refers to a processor with a single core or a processor package with multiple processor cores. In at least one embodiment, the computing system 1000 is representative of the components of the multi robot training system 200. As a specific example, system 1000 is representative of components of computing device 302. More generally, the computing system 1000 is configured to implement all logic, systems, logic flows, methods, apparatuses, and functionality described herein with reference to FIG. 1 to FIG. 9.

As used in this application, the terms "system" and "component" and "module" are intended to refer to a computer-related entity, either hardware, a combination of hardware and software, software, or software in execution, examples of which are provided by the exemplary system 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 1000 comprises a motherboard or system-on-chip (SoC) 1002 for mounting platform components. Motherboard or system-on-chip (SoC) 1002 is a point-to-point (P2P) interconnect platform that includes a first processor 1004 and a second processor 1006 coupled via a point-to-point interconnect 1070 such as an Ultra Path Interconnect (UPI). In other embodiments, the system 1000 may be of another bus architecture, such as a multi-drop bus. Furthermore, each of processor 1004 and processor 1006 may be processor packages with multiple processor cores including core(s) 1008 and core(s) 1010, respectively as well as multiple registers, memories, or caches, such as, registers 1012 and registers 1014, respectively. While the system 1000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 1004 and chipset 1032. Some platforms may include additional components and some platforms may only include sockets to mount the processors and/or the chipset. Furthermore, some platforms may not have sockets (e.g. SoC, or the like).

The processor 1004 and processor 1006 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 1004 and/or processor 1006. Additionally, the processor 1004 need not be identical to processor 1006.

Processor 1004 includes an integrated memory controller (IMC) 1020 and point-to-point (P2P) interface 1024 and P2P interface 1028. Similarly, the processor 1006 includes an IMC 1022 as well as P2P interface 1026 and P2P interface 1030. IMC 1020 and IMC 1022 couple the processors processor 1004 and processor 1006, respectively, to respective memories (e.g., memory 1016 and memory 1018). Memory 1016 and memory 1018 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 1016 and memory 1018 locally attach to the respective processors (i.e., processor 1004 and processor 1006). In other embodiments, the main memory may couple with the processors via a bus and shared memory hub.

System 1000 includes chipset 1032 coupled to processor 1004 and processor 1006. Furthermore, chipset 1032 can be coupled to storage device 1050, for example, via an interface (I/F) 1038. The I/F 1038 may be, for example, a Peripheral Component Interconnect-enhanced (PCI-e). Storage device 1050 can store instructions executable by circuitry of system 1000 (e.g., processor 1004, processor 1006, GPU 1048, ML accelerator 1054, vision processing unit 1056, or the like). For example, storage device 1050 can store computer-readable storage medium 900, and particularly instructions 316 and/or instructions for routine 800, or the like.

Processor 1004 couples to a chipset 1032 via P2P interface 1028 and P2P 1034 while processor 1006 couples to a chipset 1032 via P2P interface 1030 and P2P 1036. Direct media interface (DMI) 1076 and DMI 1078 may couple the P2P interface 1028 and the P2P 1034 and the P2P interface 1030 and P2P 1036, respectively. DMI 1076 and DMI 1078 may be a high-speed interconnect that facilitates, e.g., eight Giga Transfers per second (GT/s) such as DMI 3.0. In other embodiments, the processor 1004 and processor 1006 may interconnect via a bus.

The chipset 1032 may comprise a controller hub such as a platform controller hub (PCH). The chipset 1032 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1032 may comprise more than one controller hub such as a chipset with a memory controller hub, a graphics controller hub, and an input/output (I/O) controller hub.

In the depicted example, chipset 1032 couples with a trusted platform module (TPM) 1044 and UEFI, BIOS, FLASH circuitry 1046 via I/F 1042. The TPM 1044 is a dedicated microcontroller designed to secure hardware by integrating cryptographic keys into devices. The UEFI, BIOS, FLASH circuitry 1046 may provide pre-boot code.

Furthermore, chipset 1032 includes the I/F 1038 to couple chipset 1032 with a high-performance graphics engine, such as, graphics processing circuitry or a graphics processing unit (GPU) 1048. In other embodiments, the system 1000 may include a flexible display interface (FDI) (not shown) between the processor 1004 and/or the processor 1006 and the chipset 1032. The FDI interconnects a graphics processor core in one or more of processor 1004 and/or processor 1006 with the chipset 1032.

Additionally, ML accelerator 1054 and/or vision processing unit 1056 can be coupled to chipset 1032 via I/F 1038. ML accelerator 1054 can be circuitry arranged to execute ML related operations (e.g., training, inference, etc.) for ML models. Likewise, vision processing unit 1056 can be circuitry arranged to execute vision processing specific or related operations. In particular, ML accelerator 1054 and/or vision processing unit 1056 can be arranged to execute mathematical operations and/or operands useful for machine learning, neural network processing, artificial intelligence, vision processing, etc.

Various I/O devices 1060 and display 1052 couple to the bus 1072, along with a bus bridge 1058 which couples the bus 1072 to a second bus 1074 and an I/F 1040 that connects the bus 1072 with the chipset 1032. In one embodiment, the second bus 1074 may be a low pin count (LPC) bus. Various devices may couple to the second bus 1074 including, for example, a keyboard 1062, a mouse 1064 and communication devices 1066.

Furthermore, an audio I/O 1068 may couple to second bus 1074. Many of the I/O devices 1060 and communication devices 1066 may reside on the motherboard or system-on-chip (SoC) 1002 while the keyboard 1062 and the mouse 1064 may be add-on peripherals. In other embodiments, some or all the I/O devices 1060 and communication devices 1066 are add-on peripherals and do not reside on the motherboard or system-on-chip (SoC) 1002.

The following examples pertain to further embodiments, from which numerous permutations and configurations will be apparent.

Example 1. A computing apparatus comprising: a processor; and a memory storing instructions that, when executed by the processor, configure the apparatus to: receive indications of a plurality of images, the plurality of images to be captured by an array of cameras positioned in an environment in which at least two expert demonstrators demonstrate a collaborative task involving at least one object; identify, from the plurality of images, a plurality of markers; identify, from the plurality of images and the plurality of markers, an initial state of the object; determine, from the plurality of images and the plurality of markers, a plurality of trajectories associated with the collaborative task; and train a machine learning (ML) model to output control states for at least two robots to cooperate to perform the collaborative task involving the object based on the trajectories and the initial state of the object.

Example 2. The computing apparatus of example 1, the instructions, when executed by the processor, further configure the apparatus to determine, from the plurality of images and the plurality of markers, an initial state of the at least two expert demonstrators based on the identified markers.

Example 3. The computing apparatus of example 1, the instructions, when executed by the processor, further configure the apparatus to: identify, from the plurality of images, at least one fixed marker; and determine the plurality of trajectories based on the location of the plurality of markers relative to the fixed marker.

Example 4. The computing apparatus of example 1, the instructions, when executed by the processor, further configure the apparatus to: identify a first mapping between at least a first one of the plurality of markers and a first robot; identify a second mapping between at least a second one of the plurality of markers and a second robot; and train the ML model based on the trajectories, the initial state of the object, the first mapping and the second mapping.

Example 5. The computing apparatus of example 4, the instructions, when executed by the processor, further configure the apparatus to identify, from the plurality of images, a layout of the environment.

Example 6. The computing apparatus of example 5, the instructions, when executed by the processor, further configure the apparatus to train the ML model based on the trajectories, the initial state of the object, the first mapping, the second mapping, and the layout.

Example 7. The computing apparatus of example 6, the instructions, when executed by the processor, further configure the apparatus to: simulate an updated object state from the initial object state, the layout, and the control states for the at least two robots; and train the ML model based on the trajectories, the initial state of the object, the first mapping, the second mapping, the layout, and the updated object state.

Example 8. A non-transitory computer-readable storage medium, the computer-readable storage medium including instructions that when executed by a computer, cause the computer to: receive a plurality of images at a computer, the plurality of images to be captured by an array of cameras positioned in an environment in which at least two expert demonstrators demonstrate a collaborative task involving at least one object; identify, from the plurality of images, a plurality of markers; identify, from the plurality of images and the plurality of markers, an initial state of the object; determine, from the plurality of images and the plurality of markers, a plurality of trajectories associated with the collaborative task; and train a machine learning (ML) model to output control states for at least two robots to cooperate to perform the collaborative task involving the object based on the trajectories and the initial state of the object.

Example 9. The computer-readable storage medium of example 8, the instructions further causing the computer to determine, from the plurality of images and the plurality of markers, an initial state of the at least two expert demonstrators based on the identified markers.

Example 10. The computer-readable storage medium of example 8, the instructions further causing the computer to: identify, from the plurality of images, at least one fixed marker; and determine the plurality of trajectories based on the location of the plurality of markers relative to the fixed marker.

Example 11. The computer-readable storage medium of example 8, the instructions further causing the computer to: identify a first mapping between at least a first one of the plurality of markers and a first robot; identify a second mapping between at least a second one of the plurality of markers and a second robot; and train the ML model based on the trajectories, the initial state of the object, the first mapping and the second mapping.

Example 12. The computer-readable storage medium of example 11, the instructions further causing the computer to identify, by the processing circuitry of the computer from the plurality of images, a layout of the environment.

Example 13. The non-transitory computer-readable storage medium of example 12, the instructions further causing the computer to train the ML model based on the trajectories, the initial state of the object, the first mapping, the second mapping, and the layout.

Example 14. The computer-readable storage medium of example 13, the instructions further causing the computer to: simulate, by the processing circuitry of the computer, an updated object state from the initial object state, the layout, and the control states for the at least two robots; and train the ML model based on the trajectories, the initial state of the object, the first mapping, the second mapping, the layout, and the updated object state.

Example 15. A method for training robots for collaborative behavior, comprising: receiving a plurality of images at a computer, the plurality of images to be captured by an array of cameras positioned in an environment in which at least two expert demonstrators demonstrate a collaborative task involving at least one object; identifying, by processing circuitry of the computer from the plurality of images, a plurality of markers; identifying, by the processing circuitry of the computer from the plurality of images and the plurality of markers, an initial state of the object; determining, by the processing circuitry of the computer from the plurality of images and the plurality of markers, a plurality of trajectories associated with the collaborative task; and training a machine learning (ML) model to output control states for at least two robots to cooperate to perform the collaborative task involving the object based on the trajectories and the initial state of the object.

Example 16. The method for training robots of example 15, comprising determining, by the processing circuitry of the computer from the plurality of images and the plurality of markers, an initial state of the at least two expert demonstrators based on the identified markers.

Example 17. The method for training robots of example 15, comprising: identifying, by the processing circuitry of the computer from the plurality of images, at least one fixed marker; and determining the plurality of trajectories based on the location of the plurality of markers relative to the fixed marker.

Example 18. The method for training robots of example 15, comprising: identifying a first mapping between at least a first one of the plurality of markers and a first robot; identifying a second mapping between at least a second one of the plurality of markers and a second robot; and training the ML model based on the trajectories, the initial state of the object, the first mapping and the second mapping.

Example 19. The method for training robots of example 18, comprising identifying, by the processing circuitry of the computer from the plurality of images, a layout of the environment.

Example 20. The method for training robots of example 19, comprising training the ML model based on the trajectories, the initial state of the object, the first mapping, the second mapping, and the layout.

Example 21. The method for training robots of example 20, comprising: simulating, by the processing circuitry of the computer, an updated object state from the initial object state, the layout, and the control states for the at least two robots; and training the ML model based on the trajectories, the initial state of the object, the first mapping, the second mapping, the layout, and the updated object state.

Example 22. An apparatus, comprising means arranged to implement the function of any one of examples 15 to 21.

Other technical features may be readily apparent to one skilled in the art from the following figures, descriptions, and claims.

In addition, in the foregoing, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computing apparatus comprising:
   a processor; and
   a memory storing instructions that, when executed by the processor, configure the apparatus to:
      receive indications of a plurality of images, the plurality of images to be captured by an array of cameras positioned in an environment in which at least two expert demonstrators demonstrate a collaborative task involving at least one object;
      identify, from the plurality of images, a plurality of markers;
      identify, from the plurality of images and the plurality of markers, an initial state of the at least one object;
      determine, from the plurality of images and the plurality of markers, a plurality of trajectories associated with the collaborative task; and
      train a machine learning (ML) model to output control states for at least two robots to cooperate to perform the collaborative task involving the at least one object based on the plurality of trajectories and the initial state of the at least one object.

2. The computing apparatus of claim 1, wherein the instructions, when executed by the processor, further configure the apparatus to determine, from the plurality of images and the plurality of markers, an initial state of the at least two expert demonstrators based on the plurality of markers identified.

3. The computing apparatus of claim 1, wherein the instructions, when executed by the processor, further configure the apparatus to:
   identify, from the plurality of images, at least one fixed marker; and
   determine the plurality of trajectories based on the location of the plurality of markers relative to the fixed marker.

4. The computing apparatus of claim 1, wherein the instructions, when executed by the processor, further configure the apparatus to:
identify a first mapping between at least a first one of the plurality of markers and a first robot;
identify a second mapping between at least a second one of the plurality of markers and a second robot; and
train the ML model based on the plurality of trajectories, the initial state of the at least one object, the first mapping and the second mapping.

5. The computing apparatus of claim 4, wherein the instructions, when executed by the processor, further configure the apparatus to identify, from the plurality of images, a layout of the environment.

6. The computing apparatus of claim 5, wherein the instructions, when executed by the processor, further configure the apparatus to train the ML model based on the plurality of trajectories, the initial state of the at least one object, the first mapping, the second mapping, and the layout.

7. The computing apparatus of claim 6, wherein the instructions, when executed by the processor, further configure the apparatus to:
simulate an updated object state from the initial object state, the layout, and the control states for the at least two robots; and
train the ML model based on the plurality of trajectories, the initial state of the at least one object, the first mapping, the second mapping, the layout, and the updated object state.

8. A non-transitory computer-readable storage medium, the computer-readable storage medium including instructions that when executed by a computer, cause the computer to:
receive a plurality of images at a computer, the plurality of images to be captured by an array of cameras positioned in an environment in which at least two expert demonstrators demonstrate a collaborative task involving at least one object;
identify, from the plurality of images, a plurality of markers;
identify, from the plurality of images and the plurality of markers, an initial state of the at least one object;
determine, from the plurality of images and the plurality of markers, a plurality of trajectories associated with the collaborative task; and
train a machine learning (ML) model to output control states for at least two robots to cooperate to perform the collaborative task involving the at least one object based on the plurality of trajectories and the initial state of the at least one object.

9. The computer-readable storage medium of claim 8, wherein the instructions further cause the computer to determine, from the plurality of images and the plurality of markers, an initial state of the at least two expert demonstrators based on the plurality of markers identified.

10. The computer-readable storage medium of claim 8, wherein the instructions further cause the computer to:
identify, from the plurality of images, at least one fixed marker; and
determine the plurality of trajectories based on the location of the plurality of markers relative to the fixed marker.

11. The computer-readable storage medium of claim 8, wherein the instructions further cause the computer to:
identify a first mapping between at least a first one of the plurality of markers and a first robot;
identify a second mapping between at least a second one of the plurality of markers and a second robot; and
train the ML model based on the plurality of trajectories, the initial state of the at least one object, the first mapping and the second mapping.

12. The computer-readable storage medium of claim 11, wherein the instructions further cause the computer to identify, by the processing circuitry of the computer from the plurality of images, a layout of the environment.

13. The non-transitory computer-readable storage medium of claim 12, wherein the instructions further cause the computer to train the ML model based on the plurality of trajectories, the initial state of the at least one object, the first mapping, the second mapping, and the layout.

14. The computer-readable storage medium of claim 13, wherein the instructions further cause the computer to:
simulate, by the processing circuitry of the computer, an updated object state from the initial object state, the layout, and the control states for the at least two robots; and
train the ML model based on the plurality of trajectories, the initial state of the at least one object, the first mapping, the second mapping, the layout, and the updated object state.

15. An apparatus for training robots, comprising:
means for receiving a plurality of images at a computer, the plurality of images to be captured by an array of cameras positioned in an environment in which at least two expert demonstrators demonstrate a collaborative task involving at least one object;
means for identifying, by processing circuitry of the computer from the plurality of images, a plurality of markers;
means for identifying, by the processing circuitry of the computer from the plurality of images and the plurality of markers, an initial state of the at least one object;
means for determining, by the processing circuitry of the computer from the plurality of images and the plurality of markers, a plurality of trajectories associated with the collaborative task; and
means for training a machine learning (ML) model to output control states for at least two robots to cooperate to perform the collaborative task involving the at least one object based on the plurality of trajectories and the initial state of the at least one object.

16. The apparatus for training robots of claim 15, further comprising means for determining, by the processing circuitry of the computer from the plurality of images and the plurality of markers, an initial state of the at least two expert demonstrators based on the plurality of markers identified.

17. The apparatus for training robots of claim 15, further comprising:
means for identifying, by the processing circuitry of the computer from the plurality of images, at least one fixed marker; and
means for determining the plurality of trajectories based on the location of the plurality of markers relative to the fixed marker.

18. The apparatus for training robots of claim 15, further comprising:
means for identifying a first mapping between at least a first one of the plurality of markers and a first robot;
means for identifying a second mapping between at least a second one of the plurality of markers and a second robot; and means for training the ML model based on the plurality of trajectories, the initial state of the at least one object, the first mapping and the second mapping.

19. The apparatus for training robots of claim 18, further comprising means for identifying, by the processing circuitry of the computer from the plurality of images, a layout of the environment.

20. The apparatus for training robots of claim 19, further comprising means for training the ML model based on the plurality of trajectories, the initial state of the at least one object, the first mapping, the second mapping, and the layout.

21. The apparatus for training robots of claim 20, further comprising:
   means for simulating, by the processing circuitry of the computer, an updated object state from the initial object state, the layout, and the control states for the at least two robots; and
   means for training the ML model based on the plurality of trajectories, the initial state of the at least one object, the first mapping, the second mapping, the layout, and the updated object state.

* * * * *

UNITED STATES PATENT AND TRADEMARK OFFICE
CERTIFICATE OF CORRECTION

PATENT NO. : 12,400,133 B2
APPLICATION NO. : 17/201443
DATED : August 26, 2025
INVENTOR(S) : Venkataraman Natarajan et al.

Page 1 of 1

It is certified that error appears in the above-identified patent and that said Letters Patent is hereby corrected as shown below:

In the Claims

In Column 19, Claim 9, Line 52, delete "computer-readable storage medium of claim" and insert -- non-transitory computer-readable storage medium of claim --, therefor.

In Column 19, Claim 10, Line 57, delete "computer-readable storage medium of claim" and insert -- non-transitory computer-readable storage medium of claim --, therefor.

In Column 19, Claim 11, Line 64, delete "computer-readable storage medium of claim" and insert -- non-transitory computer-readable storage medium of claim --, therefor.

In Column 20, Claim 12, Line 6, delete "computer-readable storage medium of claim" and insert -- non-transitory computer-readable storage medium of claim --, therefor.

In Column 20, Claim 14, Line 16, delete "computer-readable storage medium of claim" and insert -- non-transitory computer-readable storage medium of claim --, therefor.

Signed and Sealed this
Thirtieth Day of September, 2025

John A. Squires
*Director of the United States Patent and Trademark Office*